United States Patent [19]

Green et al.

[11] 4,000,240
[45] Dec. 28, 1976

[54] PROCESS OF MOLDING A REINFORCED FLEXIBLE BELT

[75] Inventors: George E. Green, Niles; William J. Mayer, Palatine; Herman J. Schwartz, Chicago, all of Ill.

[73] Assignee: Teletype Corporation, Skokie, Ill.

[22] Filed: Apr. 17, 1975

[21] Appl. No.: 568,878

[52] U.S. Cl. .............................. 264/229; 264/231; 264/275

[51] Int. Cl.² ...................................... B29D 29/02

[58] Field of Search ................... 264/229, 231, 275

[56] References Cited

UNITED STATES PATENTS

| | | | |
|---|---|---|---|
| 3,062,940 | 11/1962 | Bauer | 264/275 X |
| 3,482,004 | 12/1969 | Anderson | 264/25 |
| 3,742,848 | 7/1973 | Huntoon | 101/93 C |
| 3,813,197 | 5/1974 | Ray | 425/111 |

*Primary Examiner*—Richard R. Kucia
*Attorney, Agent, or Firm*—M. Pfeffer

[57] ABSTRACT

A non-stretchable reinforcing cord is wound in a helical groove in a collapsible, cylindrical metal mandrel, and the cord is then tensioned and attached to the mandrel. The mandrel, with cord is placed in an outer mold element having a complementary cylindrical mold cavity, and a curable elastomer is injection molded into the mold space between the mandrel and cavity to mold an endless belt therebetween, and to fill the helical groove and transverse slots in the mandrel so as to form spaced parallel lugs along the inner surface of the belt, in which adjacent portions of the reinforcing cord are completely embedded, the cord being partially exposed in the spaces between lugs. The elastomer is then cured, and the mandrel collapsed to permit removal of the molded belt.

3 Claims, 5 Drawing Figures

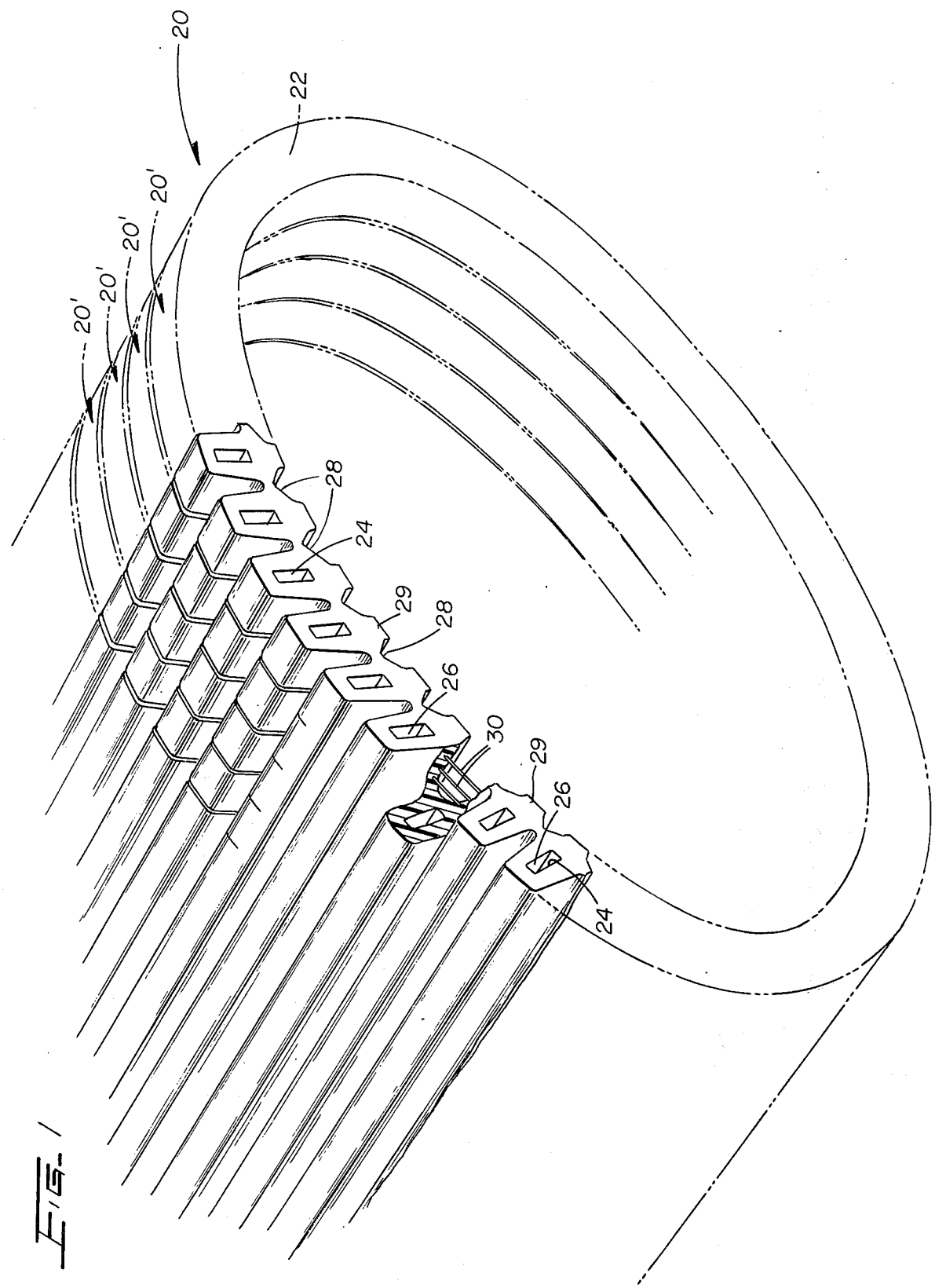

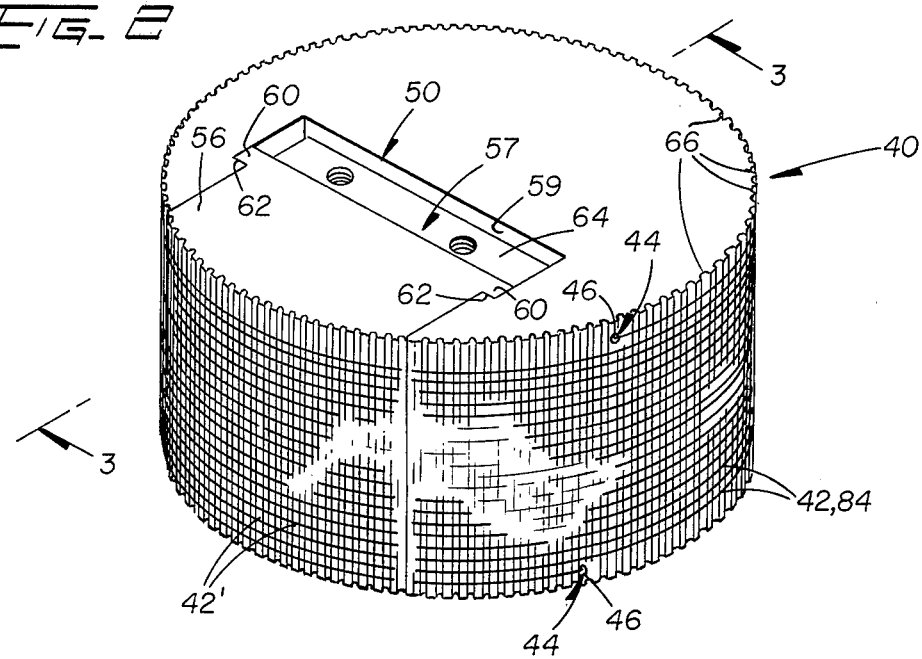
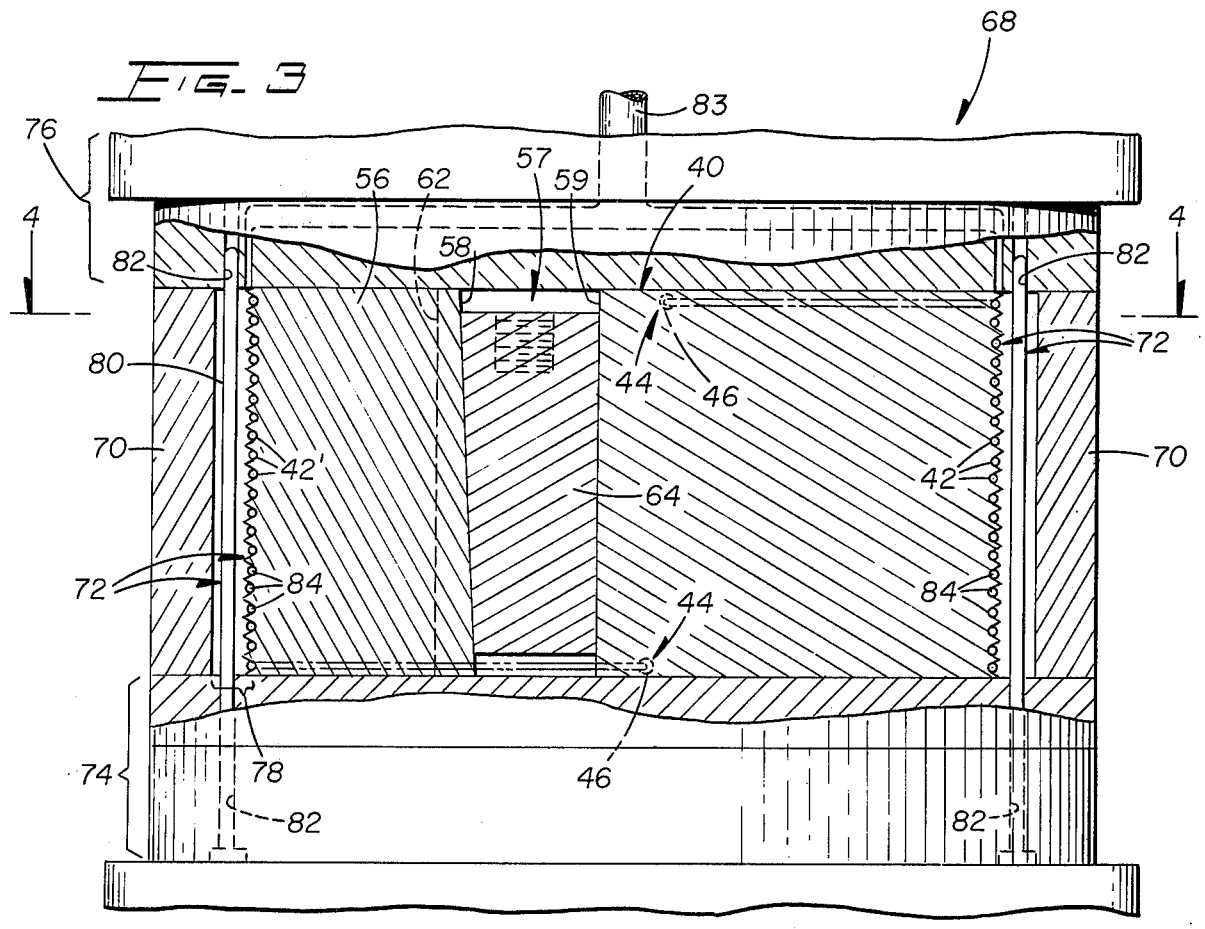

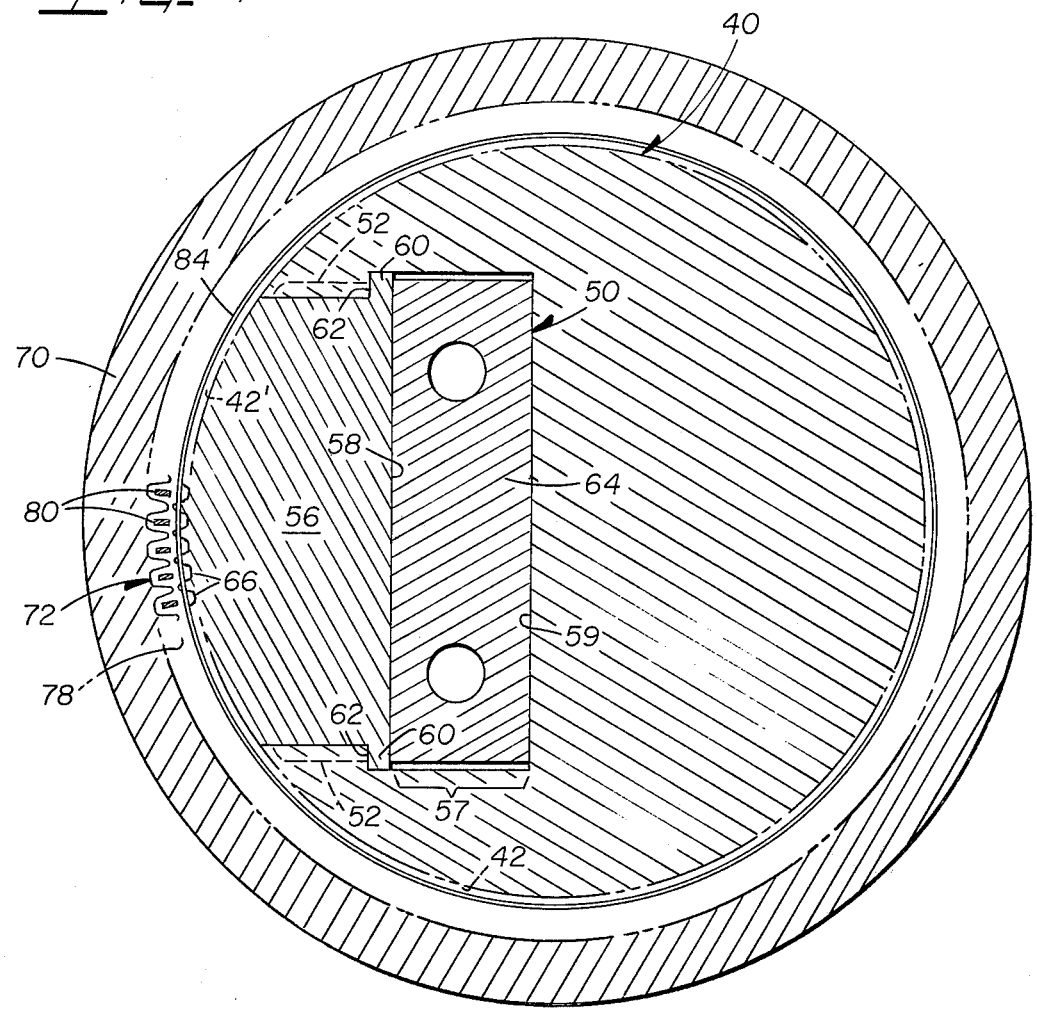
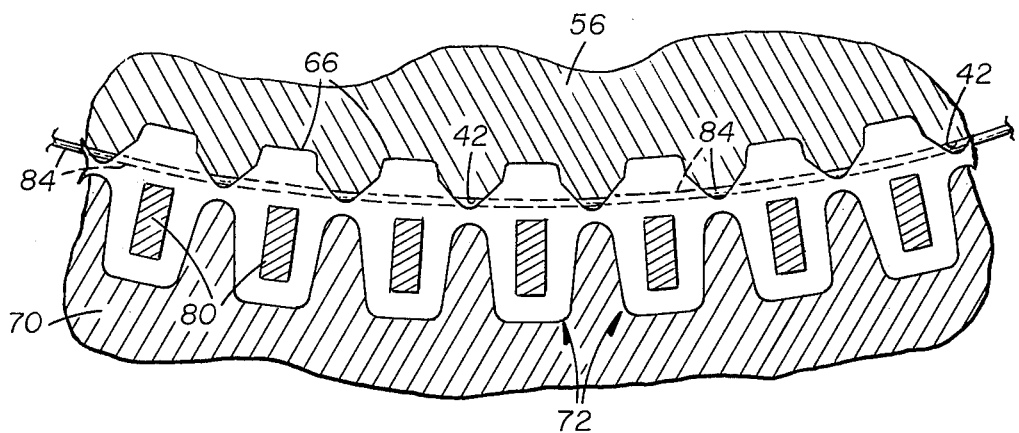

PROCESS OF MOLDING A REINFORCED FLEXIBLE BELT

FIELD OF THE INVENTION

This invention relates to a method of making a non-stretchable article, such as an open or an endless belt. An aspect of this invention relates to a method of making a non-stretchable, endless belt for use in apparatus such as high speed printers where dimensional stability is crucial.

PRIOR ART

The method is useful in making the type of belts usually found in so-called belt or chain printers of the on-the-fly type. An example of such a printer is disclosed in E. R. Wooding U.S. Pat. No. 2,918,865. A second example is described in F. E. Huntoon et al. U.S. Pat. No. 3,742,848 commonly-assigned herewith.

In such printers of the Huntoon et al. type, an endless belt having a plurality of precisely spaced drive teeth thereon carries a plurality of apertures or pockets therethrough. The pockets respectively receive the shanks of type pallets which carry type members on an end thereof and which are carried past a printing medium by the belt. The type members are selectively impacted against a type ribbon to imprint on the medium the character represented thereby. Generally speaking, such belts must have two important characteristics. First, the material of the belt is generally selected as a flexible, elastomeric compound. This characteristic is important because the pallet shank must be somewhat securely held for limited movement within the aperture as the belt traverses the printing medium. Also, the belt must be sufficiently flexible to pass around drive gears therefor.

Secondly, the belt must be non-stretchable. Specifically the drive teeth on the belt are engaged by the drive gears during printing. Because of the character of on-the-fly printers, the location of the type pallets at any predetermined time must be accurately determinable. The reason for this is that on-the-fly printing is effected and coordinated among the type pallets by rather complex logic circuitry. Obviously, if the belt stretches in use or is not dimensionally stable, the timing of the electrical logic circuitry with respect to the position of the belt and the pallets carried thereby will be variable by unknown amounts and accurate printing cannot be effected. Accordingly, non-stretchable belts are quite desirable.

The type of belt which is to be made by the present method and apparatus may be the same as or similar to the belts disclosed in U.S. Pat. No. 3,742,848 noted above, as well as U.S. Pat. Nos. 3,683,802 and 3,605,613. It should be noted that the belt apertures which hold the type pallet shanks may be transverse of the belt and perpendicular to the direction printing medium (as in U.S. Pat. Nos. 3,742,848 and 3,683,802), or the apertures may be transverse of the belt and parallel to the printing medium (as in U.S. Pat. No. 3,605,613).

An expedient way of rendering the belt non-stretchable is disclosed in the '848 patent. Specifically, a number of strands of a non-stretchable material, such as fiberglass are incorporated thereinto.

Two problems are present in making the above-described belts. If, as is usual, the belts are molded, some way must be found of incorporating thereinto the non-stretchable strands, and of maintaining precisely the relative positions of the strands to each other and to the drive teeth and pockets during molding. This problem is exacerbated if molding is effected by injection molding which is accompanied by high pressures and viscous flow which might tend to move the strands. Second, once formed, the non-stretchable belt is quite difficult to remove from a mold.

SUMMARY OF THE INVENTION

The method of this invention contemplates the making of a belt which is non-stretchable because at least partially embedded therein is a non-stretchable cord. In accordance with certain features of the invention, a length of reinforcing cord is wound in a helical groove formed around the outer periphery of a collapsible, cylindrical metal mandrel, and the cord is then tensioned and attached to the mandrel. The mandrel, with cord attached, is placed in an outer mold element having a complementary cylindrical mold cavity, and a curable elastomer is injected into the mold space between the mandrel and cavity to mold an endless belt therebetween, and to fill the helical groove and transverse slots in the mandrel with the material so as to form spaced parallel lugs along the inner surface of the belt, in which adjacent portions of the reinforcing cord are completely embedded, the cord being partially exposed in the spaces between lugs. The elastomer is then cured in the mold, and the mandrel collapsed to permit removal of the molded belt from the mandrel and the mold cavity.

Other features of the invention, and further objects and advantages thereof, will be apparent from the following detailed description of a specific embodiment thereof, when read in conjunction with the drawings.

BRIEF DESCRIPTION OF THE DRAWINGS

In the following detailed description of certain apsects of the present method, references are made to the accompanying drawings, in which:

FIG. 1 is a perspective view of belts made in accordance with the teachings hereof;

FIG. 2 is a perpective view of a portion of the apparatus used to carry out the method hereof;

FIG. 3 is a section of the apparatus shown in FIG. 2 taken generally along line 3—3 thereof;

FIG. 4 is a partial plan view of the apparatus shown in FIG. 3 taken along line 4—4; and FIG. 5 is an enlarged partial view of the apparatus shown in FIG. 4 showing in detail certain portions of the apparatus useful in performing the method hereof.

DETAILED DESCRIPTION OF ILLUSTRATED EMBODIMENTS AND CERTAIN ASPECTS THEREOF

BELT 20

As will be seen, the method herein described may be used in making any type of belt which is desired to be essentially non-stretchable. Types of belts which may be made by the apparatus and method of the present invention are those described and shown in the aforementioned U.S. Pat. Nos. 3,742,848 and 3,683,802. This type of belt is generally depicted in FIG. 1.

Again, with the understanding that any type of non-stretchable belt may be made by the method and apparatus herein disclosed, the specific belt 20 of the patents comprises an endless band 22 carrying on its outer surface a series of transverse apertures or pockets 24. These apertures 24 are intended to carry the elongated shanks of type pallets, not shown herein, but fully disclosed in the immediately above-mentioned two patents. See, for example, FIGS. 4 and 5 of the '848 patent, and FIG. 3 of the '802 patent.

The interior walls 26 of the apertures 24, and the material of the band 22 as well, are conveniently elastomeric so that the shanks are frictionally engaged by the walls 26 but movable in the apertures 24.

Along its longitudinal axis the belt 20 must be essentially non-stretchable and dimensionally stable. As noted above, this is required, because the spacing between adjacent apertures 24, as well as the spacing 28 between adjacent timing lugs 29 carried on the inside surface of the band 22, must remain constant. The spatial relationship between the timing lugs 29 and the apertures 24 while necessarily remaining constant may assume any relative position. In FIG. 1 the timing lugs 29 are shown being aligned with the apertures 24.

The non-stretchable characteristics of the belt 20 are effected by incorporating thereinto one or more strands or cords 30 of a non-stretchable material. The strands 30 are conveniently embedded in the endless band 22 and are generally directed along the dimension which is to be non-stretchable, here longitudinally of the belt 20. Although several strands 30 are shown, one may be sufficient, as long as it is present in the entire length of the band 22.

In the form of the belt 20 used by the apparatus of the '848 and '802 patents, the cords 30 are embedded in the timing lugs 29 and are partly exposed in the spaces 28 therebetween. This particular form is, of course, optional and the belt 20 may have any convenient configuration in view of the type of apparatus used to form it and the type of equipment with which it is used. From the standpoint of the non-stretchability of the belt 20, all that is necessary is that the cords 30 be embedded sufficiently in the belt 20 to render non-stretchable that portion thereof which is desired to have that property.

Although not necessary to the practice of the present method, preferred materials for the material of the belt 20 and for the material of the non-stretchable strands or cords 30 are, respectively, an injection-moldable, heat-curable polyurethane, and fiberglass.

METHOD

The apparatus used in practicing the method of the present invention includes a mandrel 40 shown in detail in FIGS. 2–5. While the cross-sectional shape of the mandrel 40 is not important to the present invention, in the preferred embodiment the mandrel has a uniform circular or generally circular cross-section as viewed from the side (see FIG. 3), so that during the belt forming operation, the belt is formed in a similar configuration.

The mandrel 40 has a continuous helix or helical groove 42 formed in the periphery thereof. As will be seen, the pitch of the helix 42 may be varied in accordance with the number of strands 30 it is desired to incorporate into the belt 20. The length and depth in the mandrel 40 of the groove 42 may also be variable consistent with the subsequent molding of the belt 20 in which the mandrel 40 is used. Typically, the mandrel is made of a metal, such as steel, which can withstand the pressure and temperature involved in injection molding, although other materials are obviously usable.

At each end of the groove 42, an anchoring facility 44 is provided for a purpose described subsequently. These anchoring facilities 44 may simply comprise a hole 46 formed in the body of the mandrel 40. Within each hole 46 there may also be provided a positively-acting clamping apparatus which will maintain within the hole 46 an object inserted thereinto.

Formed through the periphery and into the body of the mandrel 40 is a T-shaped cut-away portion 50 (FIGS. 2 and 4). Ways 52 are formed in the side walls of the cut-away 50. The portion 50 contains a T-shaped segment 56 movable in the ways 52 toward and away from the periphery of the mandrel 40. The thickness of the segment 56 as viewed in FIGS. 2 and 4 is less than the depth of the cut-away 50, so that when the periphery of the segment 56 coincides with that of the mandrel 40, a space 57 is defined by opposing walls 58 and 59 of the segment 56 and the cut-away 50. Outward movement of the segment 56 so that the peripheries of the segment 56 and the mandrel 40 coincide is limited by the engagement of abutments 60 on the segment 56 engaging abutments 62 formed in the cut-away 50 as shown in FIGS. 2 and 4. The segment 56 is maintained or locked in the position shown in FIG. 4, that is, fully outward and aligned with the periphery of the mandrel 40 by any well-known facility, such as a wedge 64 inserted into the space 57. Other locking facilities such as screw-mounted hold down devices may be obviously used, as is well-known in the molding art.

The segment 56 has formed in its periphery a helical groove 42' which, when the segment 56 is in its fully outward position, is contiguous with, and a continuation of, the groove 42 formed in the mandrel 40.

As best seen in FIG. 5, the mandrel 40 and the segment 56 also contain a plurality of spaced, parallel transverse slots or depressions 66 in their surfaces which extend radially inwardly of the mandrel periphery beyond or below the bottom of the grooves 42, 42'. In these depressions 66 there will be formed the timing lugs 29 of the belt 20.

Referring now to FIG. 3, the manner of using the mandrel 40 in an injection molding operation is described.

Injection molding apparatus, generally numbered 68 includes a female mold member 70 having a mold cavity 72 therein. The member 70 is mounted to a base 74 and is closeable with a cover plate 76. The mandrel 40 is mountable in the cavity 72 and between its periphery and the wall of the cavity 72 there is defined a molding space 78 wherein band 22 and the apertures 24 of the belt 20 are formed.

A plurality of core pins 80 are held in the space 78 by complementary apertures 82-82 in the base 74 and the cover plate 76. These core pins 80 will form, during injection molding, the transverse apertures or pockets 24 in the belt 20.

The cover plate 76 and the mold member 70 are provided with an inlet gate 83 so that the elastomeric composition may be injection molded into the mold space 78 and depressions 66 as well as around the core pins 80.

In use, a length 84 of the non-stretchable material 30 is wound within the helical grooves 42 and 42' in the mandrel 40 and the segment 56 after the segment 56 has been moved to its full outward position and locked by the wedge 64, as described above. The length 84 of the material 30 is tensioned, and then the ends thereof are inserted into the holes 46 at either end of the mandrel 40 and are anchored therein to maintain this tension. Next, the mandrel 40 with the length 84 of the non-stretchable material 30 wound thereon is placed within the mold cavity 72 and the cover plate 76 closes the cavity 72. The elastomeric composition is then injected into the mold cavity 72 through the inlet gate 83.

The injected elastomer fills the grooves 42, 42', the depressions 66, the mold space 78, and surrounds the core pins 80. The length 84 of the non-stretchable material is encompassed by and embedded in the injected elastomer 86 within the groove 42.

After the elastomer has cured, the cover plate 76 is removed as is the mandrel 40. The core pins 80 are also removed from the now formed apertures 24.

Because the now cured elastomer is embedded within the grooves 42, 42', the belt 20 formed thereon cannot be removed simply by slipping it from the mandrel 40 due to the rigidity of the cord 30. Accordingly, the wedge 64 or other holding member is removed from the space 57 and the segment 56 is slid inwardly toward the center of the mandrel 40. Such sliding decreases the effective size or the length of the perimeter of the mandrel 40. This decrease in size renders the mandrel 40 smaller in perimeter than the belt 20. Accordingly, the belt 20 may now be easily removed from the mandrel 40 after removing the ends of the length 84 of cord 30 from the holes 46.

Because the length 84 of cord 30 is contained within the grooves 42, 42' (see FIG. 2) under tension during injection molding, any tendancy it might have to move around during the high pressure and viscous flow conditions of injection molding is obviated thereby. More specifically, the location of the length 84 of cord 30 is maintained with high accuracy within the mold cavity 72 during molding, and its subsequent relationship to the timing lugs 28 and the transverse apertures 24 formed during molding is quite precisely maintained.

The above-described use of the present apparatus in accordance with the present method produces the belt 20. It should be obvious, that the belt 20 so formed may be substantially wider than the width of the belt ultimately needed in the intended work environment, in this case in a high speed printer. Accordingly, the belt 20 may be sliced or cut along its length to form a plurality of belts 20' (FIG. 1). Due to the desire to maintain the belts 20' in a non-stretchable condition, this slicing operation is effected so that each belt 20' contains embedded therein the minimum number of strands 30 of the non-stretchable material to maintain its non-stretchable characteristics. Specifically, the slicing being linear and the length 84 of cord 30 being helical, the length 84 will be cut at each boundary of the belts 20'. Thus, each belt 20' must contain sufficient strands 30 to remain non-stretchable. In some cases a single revolution or lay of strand will be sufficient, but as seen in FIG. 1 several lays are preferred.

The pitch of the helical grooves 42, 42' is coordinated with the desired width of the belts 20' and the desired number of strands 30 therein to produce a belt 20' having the requisite non-stretchability.

Many modifications of the described method will occur to the skilled art worker. For example, the elastomer 86 need not be urethane, but may be any injection-moldable material or composition. Also, fiberglass is not necessary as the material of the strands 30 as any dimensionally stable, longitudinally non-stretchable material, such as woven metal strand, will do.

Other embodiments will also occur to the skilled art worker such as changes in the shape of the mold cavity 72, the mold space 78 and the depressions 66 which will result in a product having a configuration differing from that of the belt 20.

Because all such changes and modifications may be made without departing from the spirit and scope of the claims herein, it is intended that all matter in the above specification shall be considered as illustrative only and not in a limiting sense.

What is claimed is:

1. A one-stage molding process for forming a longitudinally reinforced, endless flexible belt of an injection-moldable elastomeric material, which comprises:
    a. winding a length of a non-stretchable reinforcing cord within a helical groove formed around the outer periphery of a collapsible, cylindrical metal mandrel constituting an inner mold element and having an outer peripheral surface configured to mold the inner surface of the belt, the periphery of the mandrel also having a plurality of spaced, parallel, transverse slots extending radially inwardly of the mandrel periphery beyond the bottom of the helical groove;
    b. tensioning the cord and attaching the ends of the tensioned cord to the mandrel;
    c. placing the mandrel, with the cord wound thereon, within an outer mold element having a complementary cylindrical mold cavity with an inner peripheral surface configured to mold the outer surface of the belt;
    d. injecting a curable elastomeric material within a mold space defined between the outer mold element and the mandrel to form the belt and to fill the helical groove and the transverse slots of the mandrel with the material so that the elastomeric material in the transverse slots forms spaced parallel lugs along the inner surface of the belt, in which the adjacent portions of the reinforcing cord are completely embedded, the cord being partially exposed in the spaces between the lugs;
    e. curing the elastomeric material in the mold; and then
    f. collapsing the mandrel to permit removal of the molded belt therefrom and from the mold cavity.

2. A process as recited in claim 1, wherein the molding process further includes the step of forming a plurality of pockets through the belt transverse to both the belt and the cord, the pockets being parallel to and aligned with the lugs.

3. A process as recited in claim 2, wherein the pockets are formed by inserting a plurality of spaced core pins into the mold space between the outer mold element and the mandrel, and wherein the core pins are removed from the molded belt after the material has cured and before the mandrel is collapsed.

* * * * *